United States Patent
Uesaka et al.

(10) Patent No.: US 6,716,544 B2
(45) Date of Patent: Apr. 6, 2004

(54) COATED SINTER OF CUBIC-SYSTEM BORON NITRIDE

(75) Inventors: Shinya Uesaka, Hyogo (JP); Hitoshi Sumiya, Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/129,380

(22) PCT Filed: Mar. 5, 2001

(86) PCT No.: PCT/JP01/01726

§ 371 (c)(1),
(2), (4) Date: May 3, 2002

(87) PCT Pub. No.: WO01/66492

PCT Pub. Date: Sep. 13, 2001

(65) Prior Publication Data

US 2003/0072937 A1 Apr. 17, 2003

(30) Foreign Application Priority Data

Mar. 8, 2000 (JP) ........................................ 2000-063896

(51) Int. Cl.[7] ........................... B32B 18/00; B32B 15/04
(52) U.S. Cl. .................. 428/698; 428/660; 428/650; 428/627; 428/215; 428/217; 428/220; 428/700; 428/704
(58) Field of Search ......................... 428/698, 660, 428/661, 650, 651, 627, 632, 215, 217, 220, 332, 336, 699, 700, 704, 687

(56) References Cited

U.S. PATENT DOCUMENTS

| | | | |
|---|---|---|---|
| 4,150,098 A | 4/1979 | Sirota et al. | |
| 4,188,194 A | 2/1980 | Corrigan | |
| 5,332,629 A | * 7/1994 | Sumiya et al. | 428/627 |
| 5,691,260 A | * 11/1997 | Suzuki et al. | 501/96 |
| 6,071,841 A | * 6/2000 | Sumiya | 501/96.4 |
| 6,337,152 B1 | * 1/2002 | Kukino et al. | 428/698 |

FOREIGN PATENT DOCUMENTS

| | | |
|---|---|---|
| JP | 47-34099 | 11/1972 |
| JP | 59-8679 | 1/1984 |
| JP | 61-183187 | 8/1986 |
| JP | 63-394 | 1/1988 |
| JP | 1-208371 | 8/1989 |
| JP | 01-208371 | 8/1989 |
| JP | 3-33085 | 2/1991 |
| JP | 03-033085 | * 2/1991 |
| JP | 3-159964 | 7/1991 |
| JP | 7-75902 | 3/1995 |
| JP | 8-47801 | 2/1996 |
| JP | 8-323506 | 12/1996 |
| JP | 10-245287 | 9/1998 |
| JP | 11-246271 | 9/1999 |
| JP | 2001-220268 A | 8/2001 |

* cited by examiner

Primary Examiner—Michael LaVilla
(74) Attorney, Agent, or Firm—Foley & Lardner

(57) ABSTRACT

A coated cubic boron nitride (cBN) sintered body most suitable for a cutting tool having excellent resistance to wear and heat in the high-speed cutting of steel has been developed. The sintered body comprises (a) a base material made of a sintered body comprising at least 99.5 vol. % cBN and (b) a hard coating 0.1 to 10 $\mu$m in thickness formed on at least part of the surface of the base material by the PVD method. It is desirable that the hard coating comprise at least one compound layer consisting mainly of (a) at least one metal element selected from Al and the IV a-group elements and (b) at least one element selected from C, N, and O. It is desirable to provide between the base material and the hard coating an intermediate layer comprising a compound consisting mainly of boron and at least one metal element selected from the IV a-group elements.

18 Claims, No Drawings

COATED SINTER OF CUBIC-SYSTEM BORON NITRIDE

TECHNICAL FIELD

The present invention relates to a coated cubic boron nitride sintered body in which a sintered body consisting mainly of cubic boron nitride (hereinafter referred to as cBN) is coated with a hard layer, particularly a coated cBN sintered body that is most suitable for a cutting tool having excellent resistance to wear and heat in the high-speed cutting of steel.

BACKGROUND ART

The hardest material next to diamond, cBN has been used in a cBN sintered body in which cBN is sintered at superhigh pressures together with a 10 to 60 vol. % binder, such as TiN, TiC, Al, or Co. These cBN sintered bodies have been available in the market mainly for use in tools for the cutting of hardened steel and cast iron.

There is another type of cBN sintered body, which is produced without using a binder. The sintered body is produced by reaction-sintering hexagonal boron nitride (hBN) with the assistance of a catalyst such as magnesium boronitride. The sintered body has a thermal conductivity as high as 600 to 700 W/m·K, enabling its use as a heatsink material and a TAB bonding tool. The sintered body, however, has some amount of residual catalyst. When heated, the sintered body tends to form ninute cracks because its thermal expansion differs from that of the residual catalyst. As a result, its maximum allowable temperature is as low as about 700° C. In addition, because the cBN has a crystal-grain diameter as large as about 10 $\mu$m, the cBN sintered body is insufficient in strength, despite its high thermal conductivity. This low mechanical strength has precluded its use as a cutting tool.

On the other hand, cBN can also be synthesized by treating low-pressure BN, such as hBN, at superhigh pressures and high temperatures without using a catalyst. This process is called direct conversion. It is known that concurrent sintering with this hBN/cBN conversion can produce a cBN sintered body containing no binder. For example, the published Japanese patent applications Tokukaishou 47-34099 and Tokukaihei 3-159964 have disclosed a method of producing a cBN sintered body by converting hBN into cBN at superhigh pressures and high temperatures. The other applications Tokukoushou 63-394 and Tokukaihei 8-47801 have disclosed another method of producing a cBN sintered body by using pyrolytic boron nitride (pBN) as the material, proposing the use of the sintered body for the high-speed cutting of gray cast iron that has relatively good machinability.

However, recent years have seen an advancement in the trend toward the high-speed cutting of steel in order to improve machining efficiency and toward high-speed cutting under dry conditions in order to reduce the adverse effects on the environment. Under such circumstances, conventional tools, such as a tool made of a coated cemented carbide, have been disadvantageous because they cause problems, such as (a) a reduced tool-life due to wear resulting from the increase in the temperature and load of the cutting edge while the tool is cutting, (b) plastic deformation of the base material, (c) crack formation due to heat shock, and (d) damage resulting from insufficient strength at high temperatures.

In order to solve these problems, another application, Tokukaishou 59-8679, has proposed a method of coating a cBN sintered body having high hardness at high temperatures with a layer of $Al_2O_3$ or a composite layer of $Al_2O_3$ and any of TiC, TiN, and TiB. Yet another application, Tokukaishou 61-183187, has disclosed a method of coating the cBN sintered body stated in Tokukaishou 59-8679 with TiN, TiC, or TiCN by the physical vapor deposition (PVD) method to improve wear resistance in the cutting of cast iron and steel.

However, these coated sintered bodies are produced by using as the base material a cBN sintered body having insufficient heat resistance and strength at high temperatures. Consequently, when they are used for the high-speed cutting of steel, the coating spalls away due to the temperature rise during the cutting, resulting in the accelerated progression of wear. In addition, the base material of these coated sintered bodies has low thermal conductivity and a large coefficient of thermal expansion. Therefore, when they are used particularly for intermittent high-speed cutting, thermal cracks are formed in the base material due to intense heat shock, without showing notable improvement in resistance to wear and chipping.

A cBN sintered body containing no binder shows excellent resistance to heat and wear when used for the high-speed cutting of cast iron. However, when used for the cutting of steel, the sintered body shows accelerated progression in the wear of the cutting edge due to the reaction between the cBN and steel, significantly reducing the tool life.

Considering the above-described circumstances, an object of the present invention is to offer a coated cBN sintered body that is most suitable for a cutting tool having excellent resistance to wear and heat particularly in the high-speed cutting of steel.

Another object of the present invention is to offer a coated cBN sintered body for long-life cutting tools by firmly bonding a hard coating having excellent resistance to wear and heat to the surface of the base material made of a cBN sintered body having excellent crack resistance at high temperatures.

DISCLOSURE OF THE INVENTION

The present inventors studied the heat resistance and heat-shock resistance required for a cBN sintered body to be used as a base material, and found that when conventional cBN sintered bodies are used particularly for the cutting of low-hardness steel, the reaction between the cBN particles and the ferrous material accelerates the wear, causing the development of flank wear and face wear and the subsequent reduction in tool life due to wear or the development of chipping. The present inventors also found that high-speed cutting raises the tool temperature, accelerates the softening and deterioration of the binder, reduces the resistance to heat and heat shock of the sintered body, and thereby significantly shortens the tool life. Based on the above findings, the present invention achieves the above-described objects by providing a hard coating capable of improving wear resistance on at least part of the base material made of a sintered body comprising almost solely cBN and by specifying the thickness of the coating More specifically, the coated cBN sintered body of the present invention comprises (a) a base material made of a sintered body comprising at least 99.5 vol % cBN and (b) a hard coating 0.1 to 10 $\mu$m in thickness formed on the surface of the base material by the PVD method. In addition, the bonding quality of the hard coating can be improved by providing a specific intermediate layer between the base material and the hard coating. The constituents of the present invention are explained in detail below.

Base Material

The present invention features a base material containing at least 99.5 vol. % cBN. If less than 99.5 vol. %, the strength at high temperatures decreases due to the deterioration of the substances coexisting with the cBN, such as impurities, because they usually have low heat resistance in comparison with cBN. When the content of cBN is at least 99.5 vol. %, the wear resistance of the tool can be significantly improved because the reduction in the hardness of the base material is small even at high temperatures, which enables the hard coating to maintain its high hardness. It is particularly desirable that the content of cBN be at least 99.9 vol. % to secure the intrisincally excellent heat resistance of cBN.

It is desirable that a base material comprise cBN having an average crystal-grain diameter of at most 1 μm. Such a small crystal-grain diameter of the cBN enables further improvement of the strength of the sintered body. If the average crystal-grain diameter exceeds 1 μm, the boundary areas of the cBN grains decrease, causing an acceleration of the propagation of cracks, and thus decreasing the strength.

It is desirable that the ratio $I_{(220)}/I_{(111)}$ be at least 0.05 in the X-ray diffraction lines in an arbitrary direction of a base material, where $I_{(220)}$ denotes the intensity of the X-ray diffraction at the (220) plane of the cBN, and $I_{(111)}$ denotes the intensity of the X-ray diffraction at the (111) plane of the cBN. This specification suppresses the chipping due to cleavage, enabling the tool to maintain its strength as a cutting tool.

It is desirable that a base material have a thermal conductivity of 250 to 1,000 W/m·K and a coefficient of thermal expansion of 3.0 to $4.0 \times 10^{-6}$/K in a temperature range of 20 to 600° C. Such a high thermal conductivity and a small coefficient of thermal expansion can suppress the formation of cracks due to heat shock.

It is desirable that the above-described base material have a transverse rupture strength of at least 800 MPa when measured by the three-point bending method in a temperature range of 20 to 1,000° C. and have a Vickers hardness of at least 40,000 MPa at room temperature. This specification can improve the mechanical strength of the base material at high temperatures and decrease chipping during intermittent high-speed cutting under the condition of the increased cutting-edge temperature.

The above-described base material can be produced by directly converting low-crystalline or pulverized high-purity low-pressure BN at high pressures and high temperatures. Low-pressure BN is a boron nitride that is thermodynamically stable at normal pressure. The types of low-pressure BN include hexagonal BN (hBN), rhombohedral BN (rBN), turbostratic BN (tBN), and amorphous BN (aBN). If pBN, which has intrinsically high orientation, is used as the material, the obtained cBN sintered body tends to orient in the (111) direction. This high orientation may cause laminar cracks, spalling, or other problems when the cBN is used for a cutting tool. When hBN, which has a large crystal-grain diameter, is used as the material, the rate of conversion into cBN decreases. Consequently, the production of highly purified cBN requires increasingly rigorous conditions such as higher pressures and higher temperatures, which makes it difficult to control the crystal-grain diameter. On the other hand, when low-crystalline or pulverized high-purity low-pressure BN is used as the starting material, a cBN sintered body having low orientation and a small crystal-grain diameter can be obtained under relatively mild temperature and pressure conditions. In order to reduce the average crystal-grain diameter of cBN, it is desirable that the sintering temperature be lower than 2,200° C., more desirably between 1,800 and 2,000° C. or so.

Low-crystalline high-purity low-pressure BN can be obtained by reducing a compound that includes boron and oxygen and using a compound that includes carbon and nitrogen. It is desirable that the direct conversion from low-pressure BN into cBN be carried out after heating the low-pressure BN at a temperature higher than the boiling point of the compound that includes boron and oxygen in a non-oxidative atmosphere.

Hard Coating

It is desirable that a hard coating be composed of at least one layer of a compound selected from the group consisting of TiN, TiC, TiCN, TiAlN, and $Al_2O_3$, which have excellent wear resistance in the cutting of steel and cast iron. Of course, a plurality of the same compound layers can be laminated.

The present invention features a hard coating having a thickness of 0.1 to 10 μm. If less than 0.1 μm, the coating cannot increase the wear resistance sufficiently. If more than 10 μm, the coating tends to be damaged by spalling or chipping.

It is desirable that a hard coating have a center-line mean roughness of at most 0.1 μm at its surface. This specification can reduce the roughness of the machined surface of a workpiece, improving the machining precision. The surface roughness of a hard coating can be reduced by polishing the surface of the base material before coating or by polishing the surface of the hard coating after coating.

It is desirable that a hard coating be formed on at least the face of a cutting tool. In particular, the coating is the most effective when it is formed in the area from the face to the flank, because the area plays a principal role in the cutting work. However, the coating only on the face also can significantly suppress in particular, the development of crater wear.

A hard coating can be formed by the well-known PVD method. In particular, the ion-plating method and the sputtering method can form a coating having high quality bonding with the base material. In this case, the elastoplastic deformation of the hard coating is restricted at the interface with the base material while the tool is cutting. As a result, the hard coating can have further increased hardness and a high bonding strength that precludes spalling.

Intermediate Layer

It is desirable that an intermediate layer comprising a compound consisting mainly of boron and at least one metal element selected from the IV a-group elements be provided between the hard coating and the base material. The presence of the intermediate layer can prolong the tool life because it intensifies the bonding strength between the cBN sintered body and the hard coating. More specifically, it is desirable that the intermediate layer comprise a boride of a IV a-group element, a boronitride of a IV a-group element, or a mixed composition position of a boride of a IV a-group element and a nitride of a IV a-group element. Of these groups, it is particularly desirable to use a boride of a IV a-group element, preferably $TiB_2$.

It is desirable that an intermediate layer have a thickness of 0.05 to 3 μm. A thickness of less than 0.05 μm or more than 3 μm, does not improve the bonding quality.

As with the hard coating, an intermediate layer can be formed by the PVD method, such as the ion-plating method or the sputtering method. An intermediate layer may be formed solely by the PVD method; it may also be formed by the following method: First, a metal layer of a IV a-group element is formed on the base material by the PVD method. Second, the metal layer is heat-treated to react with the cBN in the base material. This reaction forms a boride of a IV a-group element, a boronitride of a IV a-group element, or a mixed composition of a boride of a IV a-group element and a nitride of a IV a-group element.

BEST MODE FOR CARRYING OUT THE INVENTION

The present invention is explained by the following examples.

EXAMPLE 1

Boron oxide ($B_2O_3$) and melamine ($C_3N_6H_6$) were prepared at a mole ratio of 3:1 and mixed uniformly with a mortar. The mixed materials were treated in a tubular furnace in a nitrogen-gas atmosphere at a synthesizing temperature of 850° C. for two hours. The obtained powder was washed with ethanol to remove unreacted $B_2O_3$, and treated in a high-frequency furnace in a nitrogen-gas atmosphere at 2,100° C. for two hours. A gas analysis showed that the obtained boron nitride powder had an oxygen content of 0.75 wt. %. The oxygen seems to be an impurity present as a solid solution in the hBN, because the heat treatment in the nitrogen gas at 2,100° C. completely removed the $B_2O_3$ and the adsorbed gases. An X-ray diffraction pattern for the obtained boron nitride showed that no hBN (102) diffraction line was present and that the hBN (002) diffraction line was considerably broad, demonstrating substantially low crystallinity. The calculation based on the full width at half maximum of the hBN (002) diffraction line showed that the crystallite size Lc was 8 nm.

The obtained low-crystalline low-pressure BN powder was die-pressed at 6 ton/cm$^2$ to obtain a formed body. The formed body was treated again in a high-frequency furnace in a nitrogen-gas atmosphere at 2,100° C. for two hours. The treated formed body was placed in a molybdenum capsule to be treated with a belt-type superhigh-pressure-generating system at 6.5 GPa and 1,850° C. for 15 minutes This treatment produced a sintered body. The obtained sintered body contained 99.9 vol. % cBN with an average crystal-grain diameter of 0.3 μm. X-ray diffraction showed that the ratio of the cBN (220) diffraction intensity to the cBN (111) diffraction intensity was 0.10.

The sintered body was machined into the shape of a cutting tip. Its principal surfaces as a tool, namely, the face and flank, were coated with a layer having a constitution and thickness shown in Table 1 by the arc-type ion-plating method. Thus, cutting tools made of the sintered body of the present invention and cutting tools for the comparative examples were produced. The comparative examples had the following constitutions:

Comparative Example 1-8

Its base material was made of a sintered body comprising 99.9 vol. % cBN and had no hard coating.

Comparative Example 1-9

Its base material was made of a sintered body comprising 99.9 vol. % cBN and was coated with an extremely thick TiN layer.

Comparative Example 1-10

Its base material was a commercially available tool for the cutting of hardened steel. The tool was made of a sintered body comprising about 60 vol. % cBN and a TiN binder, and was coated with a TiN layer.

Comparative Example 1-11

Its base material was a commercially available cemented carbide and was coated with a TiN layer and a TiCN layer.

These tools were used for the continuous cutting of an SCM 435 round bar (stipulated in the Japanese Industrial Standard; the same is applied to similar expressions below) having a hardness of $H_S38$ to evaluate their cutting performance. The cutting conditions were as follows:

Cutting speed: V=500 m/min.
Depth of cut: d=0.5 mm
Feed rate: f=0.15 mm/rev.
Condition: dry The amount of flank wear was measured for evaluation. The results are shown in Table 1.

TABLE 1

| | | Coating | Thickness of coating (μm) | | | |
|---|---|---|---|---|---|---|
| | Base Material | (Bottom layer: at extreme left) | Each layer from bottom | Total | Cutting time (min.) | Width of flank wear (mm) |
| Present invention | 1-1 99.9% cBN | TiN | 0.3 | 0.3 | 20 | 0.3 |
| | 1-2 99.9% cBN | TiN | 2.5 | 2.5 | 20 | 0.18 |
| | 1-3 99.9% cBN | TiN/TiAlN | 1.0/2.5 | 3.5 | 20 | 0.15 |
| | 1-4 99.9% cBN | TiN/TiCN | 0.5/0.5 | 1.0 | 20 | 0.16 |
| | 1-5 99.9% cBN | TiN/TiC/TiN | 0.5/2.0/2.0 | 4.5 | 20 | 0.25 |
| | 1-6 99.9% cBN | TiN/TiCN/TiN | 0.5/4.0/4.0 | 8.5 | 20 | 0.14 |
| | 1-7 99.9% cBN | TiC/TiN | 2.0/4.0 | 6.0 | 20 | 0.28 |
| Comparative example | 1-8 99.9% cBN | None | — | — | 5 | 0.48 |
| | 1-9 99.9% cBN | TiN | 15.0 | 15.0 | 3 | Chipping |
| | 1-10 Commercial cBN | TiN | 2.0 | 2.0 | 10 | 0.38 |
| | 1-11 Commercial cemented carbide | TiN/TiCN | 0.5/2.0 | 2.5 | 10 | 0.43 |

As can be seen from Table 1, all the examples of the present invention were satisfactory in showing the narrow flank wear at a cutting time of 20 minutes. On the other hand, Comparative example 1-8, which had no hard coating, resulted in the termination of cutting in an extremely short time, showing wide flank wear. Comparative example 1-9, which had an extremely thick hard coating, developed chipping and also resulted in the termination of cutting in an extremely short time. Comparative example 1-10, which contained a small amount of cBN despite being provided with a hard coating, showed an unsatisfactory heat resistance of the base material; the flank wear was wide and cutting was terminated in a short time.

EXAMPLE 2

As with Example 1, a highly purified low-crystalline low-pressure BN powder was used as the material. A formed body of the material was placed in a molybdenum capsule to be treated with a belt-type superhigh-pressure-generating system at a pressure of 6.5 GPa and a temperature of 1,850° C. for 15 minutes. This direct conversion produced a cBN sintered body.

The sintered body was machined into the shape of a cutting tip. Its principal surfaces as a tool, namely, the face and flank, were coated with a layer having a constitution and thickness shown in Table 2 by the arc-type ion-plating method. Thus, cutting tools made of the sintered body of the present invention and cutting tools for the comparative examples were produced.

The cutting tool's base material made of the sintered body of the present invention contained 99.9 vol. % cBN with an average crystal-grain diameter of 0.3 μm. X-ray diffraction showed that the ratio of the cBN (220) diffraction intensity to the cBN (111) diffraction intensity was 0.10. The comparative examples were the same as those used in Example 1.

These tools were used for the intermittent cutting of an SCM 415 round bar having a hardness of $H_B150$, a diameter of 300 mm, and 12 V-shaped grooves on the perimeter to evaluate their cutting performance. The cutting conditions were as follows:

Cutting speed: V=800 m/min.
Depth of cut: d=0.5 mm
Feed rate: f=0.15 mm/rev.
Condition: wet The amount of tool wear after a 5-minute cutting and the tool life due to chipping were measured for evaluation. The results are shown in Table 2.

EXAMPLE 3

As with Example 1, a highly purified low-crystalline low-pressure BN powder was used as the material. A formed body of the material was placed in a molybdenum capsule to be treated with a belt-type superhigh-pressure-generating system at a pressure of 6.5 GPa and a temperature of 1,800 to 2,000° C. for 15 minutes. This treatment produced a cBN sintered body. Table 4 shows the composition of the obtained cBN sintered body, the crystal-grain diameter of the cBN, and the ratio of the cBN (220) diffraction intensity to the cBN (111) diffraction intensity in X-ray diffraction.

The cBN sintered body was machined into the shape of a cutting tip. Its face and flank were coated with a TiN layer having a thickness of about 1.5 μm by the ion-plating method. The following comparative examples were also prepared:

Comparative Example 3-6

Its cBN sintered body was obtained by treating the material at 6.5 GPa and an increased temperature of 2,200° C. for 15 minutes. The obtained cBN sintered body was machined into the shape of a cutting tip. Its was coated with a TiN layer having a thickness of about 1.5 μm by the same method as mentioned above to complete the tool.

Comparative Example 3-7

Its cBN sintered body was obtained by treating the material, in this case pBN, at 6.5 GPa and 1,850° C. for 15 minutes. The obtained cBN sintered body was machined into the shape of a cutting tip. It was coated with a TiN layer having a thickness of about 1.5 μm by the same method as mentioned above to complete the tool.

Comparative example 3-8: Its base material was a commercially available tool for the cutting of hardened steel. The tool, made of a sintered body comprising about 60 vol. % cBN and a TiN binder, was coated with a TiN layer by the same method as mentioned above A cutting test was carried out by continuously cutting an SCM 415 round bar having a hardness of $H_B180$ under the following conditions:

TABLE 2

| | | Base material | Coating (Bottom layer: at extreme left) | Thickness of coating (μm) Each layer from bottom | Thickness of coating (μm) Total | Width of flank wear after 5-min. cutting (mm) | Tool life due to chipping (min.) |
|---|---|---|---|---|---|---|---|
| Present invention | 2-1 | 99.9% cBN | TiN | 0.3 | 0.3 | 0.36 | 13 |
| | 2-2 | 99.9% cBN | TiN | 2.5 | 2.5 | 0.32 | 13.5 |
| | 2-3 | 99.9% cBN | TiN/TiAlN | 1.0/2.5 | 3.5 | 0.45 | 10 |
| | 2-4 | 99.9% cBN | TiN/TiCN | 0.5/0.5 | 1.0 | 0.28 | 18 |
| | 2-5 | 99.9% cBN | TiN/TiC/TiN | 0.5/2.0/2.0 | 4.5 | 0.24 | 12.5 |
| | 2-6 | 99.9% cBN | TiN/TiCN/TiN | 0.5/4.0/4.0 | 8.5 | 0.30 | 15 |
| | 2-7 | 99.9% cBN | TiC/TiN | 2.0/4.0 | 6.0 | 0.48 | 13 |
| Comparative example | 2-8 | 99.9% cBN | None | — | — | 0.72 | 5.8 |
| | 2-9 | 99.9% cBN | TiN | 5.0 | 15.0 | Chipping | 3 |
| | 2-10 | Commercial cBN | TiN | 2.0 | 2.0 | Chipping due to thermal cracks | 0.8 |
| | 2-11 | Commercial cemented carbide | TiN/TiCN | 0.5/2.0 | 2.5 | Chipping | 0.3 |

As can be seen from Table 2, all the examples of the present invention also had a long tool life determined by the development of chipping in intermittent cutting. On the other hand, all the comparative examples had a short tool life due to chipping, showing inferior resistance to wear and chipping.

Cutting speed: V=500 m/min.
Depth of cut: d=0.5 mm
Feed rate: f=0. 15 mm/rev.
Condition: wet The amount of flank wear of the tool was measured after a 10-minute cutting. The results are also shown in Table 3.

TABLE 3

|  |  | Sintering temperature (° C.) | Crystal-grain diameter (μm) | CBN content (vol. %) | Ratio of X-ray diffraction intensities of cBN $I_{(220)}/I_{(111)}$ | Cutting time (min.) | Amount of flank wear (mm) |
| --- | --- | --- | --- | --- | --- | --- | --- |
| Present invention | 3-1 | 1,800 | At most 0.5 | 99.7 | 0.22 | 10 | 0.113 |
|  | 3-2 | 1,850 | At most 0.5 | 99.9 | 0.10 | 10 | 0.108 |
|  | 3-3 | 1,880 | At most 0.5 | 99.9 | 0.12 | 10 | 0.120 |
|  | 3-4 | 1,950 | 0.5–1 | 99.9 | 0.08 | 10 | 0.096 |
|  | 3-5 | 2,000 | 0.5–1 | 100 | 0.08 | 10 | 0.110 |
| Comparative example | 3-6 | 2,200 | 3–5 | 100 | 0.18 | 1.2 | Chipping |
|  | 3-7 (Material: pBN) | 1,850 | At most 0.5 | 99.8 | 0.04 | 1.6 | Chipping |
|  | 3-8 (Commercial tool) | — | 0.5–4 | 60 | — | 1 | Chipping due to thermal cracks |

As can be seen from the data on the examples of the present invention in Table 3, it is desirable that the base material be sintered at 1,800 to 2,000° C. or so. On the other hand, all the comparative examples developed chipping, showing a short tool life.

In addition, the base materials for Example 3-1 to 3-5 of the present invention and Comparative example 3-6 to 3-8 were subjected to the measurements of hardness, transverse rupture strength, a coefficient of thermal expansion, and thermal conductivity. The hardness was measured by the Vickers hardness. The transverse rupture strength was measured by the three-point bending method by varying the atmospheric temperature from 20 to 1,000° C. The test specimen had a size of 6×3×0.7 mm (span: 4 mm). The coefficient of thermal expansion was measured by varying the temperature from 20 to 600° C. The measured results are shown in Table 4.

body of the material was placed in a molybdenum capsule to be treated with a belt-type superhigh-pressure-generating system at a pressure of 6.5 GPa and a temperature of 1,850° C. for 15 minutes. This direct conversion produced a cBN sintered body. The cBN sintered body was machined into the shape of a cutting tip having a nose radius of 0.2 mm and a relief angle of 7 degrees at the tip end. The cBN sintered body's surface corresponding to the face was mirror-polished, and the surface corresponding to the flank was ground by using a No. 3,000 grinding wheel such that the remaining chipping at the tip end became at most 1 μm in width.

The cBN sintered body's principal surfaces as a tool, namely, the face and flank, were coated with a TiN layer having a thickness shown in Table 4 and a center-line mean roughness of at most 0.1 μm at its surface by the arc-type ion-plating method. Thus, cutting tools made of the sintered

TABLE 4

|  |  | $H_V$ hardness (MPa) | Transverse rupture strength (MPa) | | | Coefficient of thermal expansion (×10⁻⁶/K) | | | Thermal conductivity |
| --- | --- | --- | --- | --- | --- | --- | --- | --- | --- |
|  |  | 20° C. | 20° C. | 500° C. | 1,000° C. | 20° C. | 300° C. | 600° C. | (W/m · K) |
| Example | 3-1 | 44,100 | 1,010 | 1,060 | 1,280 | 3.6 | 3.8 | 3.9 | 360 |
|  | 3-2 | 49,500 | 1,250 | 1,320 | 1,500 | 3.6 | 3.8 | 3.9 | 420 |
|  | 3-3 | 51,000 | 1,320 | 1,280 | 1,620 | 3.6 | 3.8 | 3.9 | 420 |
|  | 3-4 | 57,400 | 1,240 | 1,180 | 1,030 | 3.3 | 3.5 | 3.7 | 470 |
|  | 3-5 | 56,900 | 1,020 | 1,130 | 940 | 3.3 | 3.5 | 3.6 | 510 |
| Comparative example | 3-6 | 54,900 | 610 | 590 | 370 | 3.1 | 3.3 | 3.6 | 580 |
|  | 3-7 | 52,200 | 1,030 | 720 | 590 | 3.5 | 3.8 | 3.9 | 385 |
|  | 3-8 | 30,900 | 1,130 | 932 | 412 | 4.2 | 4.5 | 4.9 | 60 |

As can be seen from Tables 3 and 4, the following samples showed satisfactory results:

①: the sample whose base material has a Vickers hardness of at least 40,000 MPa at room temperature
②: the sample whose base material has a transverse rupture strength of at least 800 MPa when measured by the three-point bending method at a temperature range of 20 to 1,000° C.
③: the sample whose base material has a coefficient of thermal expansion of 3.0 to 4.0×10⁻⁶/K at a temperature range of 20 to 600° C.
④: the sample whose base material has a thermal conductivity of 250 to 1,000 W/m·K.

EXAMPLE 4

As with Example 1, a highly purified low-crystalline low-pressure BN powder was used as the material. A formed body of the present invention were produced. The comparative examples were produced such that their coated surface had a center-line mean roughness exceeding 0.1 μm.

These tools were used for the continuous cutting of a round bar made of an SUJ2 bearing steel having a hardness of $H_{RC}$ 56 and a diameter of 80 mm. The cutting conditions were as follows:

Cutting speed: V=30 m/min.
Depth of cut: d=0.05 mm
Feed rate: f=0.01 mm/rev.
Condition: dry The surface roughness "Rmax" of the machined workpieces was measured after a 3-minute cutting. The results are shown in Table 5.

TABLE 5

|  |  | Thickness of coating ($\mu$m) | Surface roughness of coating ($\mu$m) | Surface roughness of machined workpiece Rmax ($\mu$m) |
|---|---|---|---|---|
| Present invention | 4-1 | 0.5 | 0.03 | 0.08 |
|  | 4-2 | 0.5 | 0.07 | 0.18 |
|  | 4-3 | 2.5 | 0.05 | 0.17 |
|  | 4-4 | 3.0 | 0.04 | 0.10 |
|  | 4-5 | 6.0 | 0.08 | 0.21 |
| Comparative example | 4-6 | 0.5 | 0.23 | 0.53 |
|  | 4-7 | 15 | 0.85 | 1.82 |

As can be seen from Table 5, the examples of the present invention, which had a center-line mean roughness of at most 0.1 $\mu$m at the surface of their hard coating, showed small surface roughness in the machined workpieces, demonstrating high-precision cutting. On the other hand, the comparative examples, which had a large center-line mean roughness at the surface of their hard coating, showed large surface roughness in the machined workpieces. In particular, Comparative example 4-7, which had an excessively thick hard coating, developed spalling away of the hard coating, showing large surface roughness in the machined workpieces.

EXAMPLE 5

A low-crystalline low-pressure BN powder was die-pressed at 6 ton/cm$^2$ to obtain a formed body. The formed body was highly purified in a high-frequency furnace in a nitrogen-gas atmosphere at 2,100° C. for two hours. The treated formed body was placed in a molybdenum capsule to be treated with a belt-type super high-pressure generating system at 6.5 GPa and 1,850° C. for 15 minutes. This treatment produced a sintered body containing 99.9 vol % cBN with an average crystal-grain diameter of 0.3 $\mu$m. X-ray diffraction showed that the ratio of the cBN (220) diffraction intensity to the cBN (111) diffraction intensity was 0.10.

The sintered body was machined into the shape of a cutting tip. The surfaces involved in the cutting work as a tool, namely, the face and flank, were coated with an intermediate layer. Next, the intermediate layer was covered with a hard coating having a constitution and thickness shown in Table 1 by using the arc-type ion-plating method. An oxide layer constituting a part of the hard coatings was formed by the magnetron sputtering method. Thus, the tools for the examples of the present invention, those for the reference examples, and those for the comparative examples were produced.

The intermediate layer was formed by either of the following two methods:

(a) First, a layer of a IV a-group metal was formed by the arc-type ion-plating method. Second, the metal layer was heat-treated at 1,100° C. for 30 minutes in a vacuum at a pressure of 1.3×10$^{-3}$ Pa to react with the cBN. This reaction produced a layer made of a boride of a IV a-group element or made of a mixed composition of a boride of a IV a-group element and a nitride of a IV a-group element.

(b) A layer similar to that in (a) was formed only by the arc-type ion-plating method.

In Table 6, the method (a) is referred to as "heat treatment" and the method (b) is referred to as "PVD only."

The reference examples were prepared as follows:

Reference Example 5-13

No intermediate layer was provided.

Reference Example 5-14

The intermediate layer was significantly thick.

Reference Example 5-15

The base material had a cBN content of 99.5% The types of comparative examples included an example that was produced by coating a commercially available cBN-sintered-body tool with a hard coating and an example that was a commercially available coated cemented-carbide tool. Comparative examples were prepared as follows:

Comparative Example 5-18

A commercially available tool made of a cBN sintered body for the cutting of hardened steel was coated with TiAlN. The cBN sintered body contained TiN as a binder and its cBN content was about 60 vol. %

Comparative Example 5-19

This example was a commercially available cemented-carbide tool coated with TiAlN.

These tools were used for the continuous cutting of an SCM 435 round bar having a hardness of H$_S$ 35 to evaluate their cutting performance. The cutting conditions were as follows:

Cutting speed: V=800 m/min.

Depth of cut: d=0.5 mm

Feed rate: f=0.15 mm/rev.

Condition: dry

The cutting was carried out for at most 15 minutes to measure the amount of flank wear of the tool. The results are shown in Table 6.

TABLE 6

|  |  | CBN content of base material | Intermediate layer | Thickness of intermediate layer ($\mu$m) | Production method | Coating (Bottom layer: at left) | Thickness of coating (each layer from bottom) ($\mu$m) | Cutting time (min.) | Width of flank wear (mm) |
|---|---|---|---|---|---|---|---|---|---|
| Example | 5-1 | 99.9% | TiB$_2$ | 0.07 | Heat treatment | TiN | 0.35 | 15 | 0.43 |
|  | 5-2 | 99.9% | TiB$_2$ | 0.3 | Heat treatment | TiCN | 1.0 | 15 | 0.27 |
|  | 5-3 | 99.9% | TiB$_2$ | 0.3 | Heat treatment | TiN/TiAlN | 0.5/2.0 | 15 | 0.22 |
|  | 5-4 | 99.9% | TiB$_2$ | 0.2 | Heat treatment | Al$_2$O$_3$/TiN | 4.5/1.5 | 15 | 0.15 |
|  | 5-5 | 99.9% | TiB$_2$ | 2.5 | Heat treatment | TiAlN | 4.0 | 15 | 0.40 |
|  | 5-6 | 99.9% | TiB$_2$, TiN | 1.0 | Heat treatment | TiCN | 2.0 | 15 | 0.25 |
|  | 5-7 | 99.9% | TiB$_2$ | 0.1 | Heat treatment | ZrN | 2.0 | 15 | 0.16 |
|  | 5-8 | 99.9% | TiB$_2$ | 0.3 | PVD only | (Ti, Zr) N | 6.5 | 15 | 0.20 |

TABLE 6-continued

|  |  | CBN content of base material | Intermediate layer | Thickness of intermediate layer ($\mu$m) | Production method | Coating (Bottom layer: at left) | Thickness of coating (each layer from bottom) ($\mu$m) | Cutting time (min.) | Width of flank wear (mm) |
|---|---|---|---|---|---|---|---|---|---|
|  | 5-9 | 99.9% | TiB$_2$ | 1.0 | PVD only | TiCN | 1.5 | 15 | 0.33 |
|  | 5-10 | 99.9% | TiBN | 0.5 | PVD only | TiAlN | 1.0 | 15 | 0.32 |
|  | 5-11 | 99.9% | TiB$_2$, TiN | 0.1 | Heat treatment | TiAlN | 0.3 | 15 | 0.42 |
|  | 5-12 | 99.9% | TiBN | 0.5 | PVD only | TiCN/TiN | 6.5/2.0 | 15 | 0.30 |
| Reference example | 5-13 | 99.9% | None |  |  | TiAlN | 3.0 | 2 | 0.76 |
|  | 5-14 | 99.9% | TiB$_2$ | 5.0 | Heat treatment | TiCN | 2.0 | 5 | 0.92 |
|  | 5-15 | 99.5% | TiB$_2$ | 0.3 | PVD only | TiCN | 2.5 | 12 | Chipping |
| Comparative example | 5-16 | 99.9% | TiB$_2$ | 0.3 | Heat treatment | TiCN | 13.0 | 2 | 0.68 |
|  | 5-17 | 98.8% | TiB$_2$, TiN | 0.2 | Heat treatment | TiCN | 2.5 | 10 | Chipping |
|  | 5-18 | Commercial cBN | TiB$_2$ | 0.3 | PVD only | TiAlN | 3.0 | 1 | 0.52 |
|  | 5-19 | Commercial cemented carbide | TiB$_2$ | 0.5 | PVD only | TiAlN | 3.0 | 0.2 | Chipping |

As can be seen from Table 6, all the examples of the present invention, which were provided with an intermediate layer, were capable of 15-minute cutting, showing small amounts of wear. On the other hand, the reference example having an intermediate layer as thick as 5 $\mu$m resulted in the termination of cutting in a short time.

EXAMPLE 6

The tools provided in Example 5 as the examples, the reference examples, and the comparative examples were used for the intermittent cutting of an SCM 415 round bar having a hardness of H$_B$ 150 and a diameter of 300 mm. The round bar was provided with 12 V-shaped grooves on its perimeter to apply heat shock. The cutting conditions were as follows:

Cutting speed: V=800 m/min.
Depth of cut: d=0.5 mm
Feed rate: f=0.15 mm/rev.
Condition: wet The cutting was carried out to measure the tool life due to chipping. The results are shown in Table 7.

TABLE 7

|  |  | CBN content of base material | Intermediate layer | Thickness of intermediate layer ($\mu$m) | Production method | Coating (Bottom layer: at left) | Thickness of coating (each layer from bottom) ($\mu$m) | Tool life due to chipping (min.) |
|---|---|---|---|---|---|---|---|---|
| Example | 6-1 | 99.9% | TiB$_2$ | 0.07 | Heat treatment | TiN | 0.35 | 11 |
|  | 6-2 | 99.9% | TiB$_2$ | 0.3 | Heat treatment | TiCN | 1.0 | 15 |
|  | 6-3 | 99.9% | TiB$_2$ | 0.3 | Heat treatment | TiN/TiAlN | 0.5/2.0 | 13 |
|  | 6-4 | 99.9% | TiB$_2$ | 0.2 | Heat treatment | Al$_2$O$_3$/TiN | 4.5/1.5 | 10 |
|  | 6-5 | 99.9% | TiB$_2$ | 2.5 | Heat treatment | TiAlN | 4.0 | 7 |
|  | 6-6 | 99.9% | TiB$_2$, TiN | 1.0 | Heat treatment | TiCN | 2.0 | 13.5 |
|  | 6-7 | 99.9% | TiB$_2$ | 0.1 | Heat treatment | ZrN | 2.0 | 15 |
|  | 6-8 | 99.9% | TiB$_2$ | 0.3 | PVD only | (Ti, Zr) N | 6.5 | 8.5 |
|  | 6-9 | 99.9% | TiB$_2$ | 1.0 | PVD only | TiCN | 1.5 | 12 |
|  | 6-10 | 99.9% | TiBN | 0.5 | PVD only | TiAlN | 1.0 | 11 |
|  | 6-11 | 99.9% | TiB$_2$, TiN | 0.1 | Heat treatment | TiAlN | 0.3 | 12 |
|  | 6-12 | 99.9% | TiBN | 0.5 | PVD only | TiCN/TiN | 6.5/2.0 | 7.5 |
| Reference example | 6-13 | 99.9% | None |  |  | TiAlN | 3.0 | 3.5 |
|  | 6-14 | 99.9% | TiB$_2$ | 5.0 | Heat treatment | TiCN | 2.0 | 3 |
|  | 6-15 | 99.5% | TiB$_2$ | 0.3 | PVD only | TiCN | 2.5 | 3 |
| Comparative example | 6-16 | 99.9% | TiB$_2$ | 0.3 | Heat treatment | TiCN | 13.0 | 1.6 |
|  | 6-17 | 98.8% | TiB$_2$, TiN | 0.2 | Heat treatment | TiCN | 2.5 | 1.2 |
|  | 6-18 | Commercial cBN | TiB$_2$ | 0.3 | PVD only | TiAlN | 3.0 | 0.1 |
|  | 6-19 | Commercial cemented carbide | TiB$_2$ | 0.5 | PVD only | TiAlN | 3.0 | 0.05 |

As can be seen from Table 7, the examples of the present invention, which were provided with an intermediate layer, showed a long tool life determined by the development of chipping even in intermittent cutting.

EXAMPLE 7

As with Example 5, a highly purified low-crystalline low-pressure BN powder was used as the material. A formed body of the material was placed in a molybdenum capsule to be treated with a belt-type superhigh-pressure-generating system at a pressure of 6.5 GPa and a temperature of 1,800 to 2,000° C. for 15 minutes. This treatment produced a cBN sintered body. Table 8 shows the composition of the obtained cBN sintered body, the crystal-grain diameter of the cBN, the ratio of the cBN (220) diffraction intensity to the cBN (111) diffraction intensity in X-ray diffraction.

The cBN sintered body was machined into the shape of a cutting tip. Its face and flank were coated with a Ti layer having a thickness of about 0.5 μm by the ion-plating method. The Ti-coated sintered body was heat-treated in a vacuum furnace at 1,100° C. for 30 minutes in a vacuum at a pressure of $1.3 \times 10^{-3}$ Pa to form an intermediate layer made of $TiB_2$. The $TiB_2$ layer was then coated with a TiAlN The amount of flank wear of the tool was measured after a 10-minute cutting. The results are also shown in Table 8. The base materials were subjected to the measurements of hardness, transverse rupture strength from room temperature to 1,000° C., a coefficient of thermal expansion from room temperature to 600° C., and thermal conductivity by using methods similar to those used for obtaining the results in Table 4 described in Example 3. The measured results were similar to those shown in Table 4.

TABLE 8

|  |  | Sintering temperature (° C.) | Crystal-grain diameter (μm) | CBN content (vol. %) | Ratio of X-ray diffraction intensities of cBN $I_{(220)}/I_{(111)}$ | Cutting time (min.) | Amount of flank wear (mm) |
|---|---|---|---|---|---|---|---|
| Example | 7-1 | 1,800 | At most 0.5 | 99.7 | 0.22 | 10 | 0.086 |
|  | 7-2 | 1,850 | At most 0.5 | 99.9 | 0.10 | 10 | 0.094 |
|  | 7-3 | 1,880 | At most 0.5 | 99.9 | 0.12 | 10 | 0.081 |
|  | 7-4 | 1,950 | 0.5–1 | 99.9 | 0.08 | 10 | 0.102 |
|  | 7-5 | 2,000 | 0.5–1 | 100 | 0.08 | 10 | 0.110 |
| Comparative example | 7-6 | 2,200 | 3–5 | 100 | 0.18 | 0.1 | Chipping |
|  | 7-7 (Material: pBN) | 1,850 | At most 0.5 | 99.8 | 0.04 | 1.0 | Chipping |
|  | 7-8 (Commercial tool) | — | 0.5–4 | 60 | — | 0.2 | Chipping due to thermal cracks | layer having a thickness of about 1.0 μm. Thus, the examples of the present invention were produced. The following tools were also prepared as comparative examples to be subjected to an evaluation test of cutting performance:

Comparative Example 7-6

Its cBN sintered body was obtained by treating the material at 6.5 GPa and an increased temperature of 2,200° C. for 15 minutes. The obtained cBN sintered body was coated with a TiN layer having a thickness of about 1.5 μm to complete the tool.

Comparative Example 7-7

Its cBN sintered body was obtained by treating the material, in this case pBN, at 6.5 GPa and 1,850° C. for 15 minutes. The obtained cBN sintered body was coated with a TiN layer having a thickness of about 1.5 μm to complete the tool.

Comparative example 7-8

The base material was a commercially available cBN-sintered-body tool for the cutting of hardened steel. This base material contained TiN as a binder, and its cBN content was about 65 vol. %. The base material was coated with TiB2 and TiAlN by the ion-plating method.

A cutting test was carried out by intermittently cutting an SCM 415 round bar having a hardness of $H_B$ 180 and a diameter of 300 mm. The round bar was provided with 12 V-shaped grooves on its perimeter to apply heat shock. The cutting conditions were as follows:

Cutting speed: V=500 m/min.
Depth of cut: d=0.5 mm
Feed rate: f=0.15 mm/rev.
Condition: wet As can be seen from the data on the examples of the present invention in Table 8, it is desirable that the base material be sintered at 1,800 to 2,000° C. or so. On the other hand, all the comparative examples developed chipping, showing a short tool life.

Table 8 in collaboration with Table 4 reveals that the following samples showed satisfactory results:

①: the sample whose base material has a Vickers hardness of at least 40,000 MPa at room temperature ②: the sample whose base material has a transverse rupture strength of at least 800 MPa when measured by the three-point bending method at a temperature range of 20 to 1,000° C.

③: the sample whose base material has a coefficient of thermal expansion of 3.0 to $4.0 \times 10^{-6}$/K at a temperature range of 20 to 600° C.

④: the sample whose base material has a thermal conductivity of 250 to 1,000 W/m·K.

EXAMPLE 8

As with Example 5, a highly purified low-crystalline low-pressure BN powder was used as the material. A formed body of the material was placed in a molybdenum capsule to be treated with a belt-type super high-pressure generating system at a pressure of 6.5 GPa and a temperature of 1,850° C. for 15 minutes. This direct conversion produced a cBN sintered body. The cBN sintered body was machined into the shape of a cutting tip having a nose radius of 0.4 mm and a relief angle of 7 degrees at the tip end. The cBN sintered body's surface corresponding to the face was mirror-polished by using a diamond abrasive grain having a diameter of at most 3 μm. The surface corresponding to the flank was ground by using a No. 3,000 grinding wheel such that the remaining chipping at the tip end became at most 1 μm in width. The cBN sintered body's principal surfaces as a tool, namely, the face and flank, were coated with a Ti layer having a thickness of about 0.08 μm by the ion-plating method. The Ti-coated sintered body was heat-treated in a vacuum furnace at 1,100° C. for 30 minutes in a vacuum at a pressure of $1.3 \times 10^{-3}$ Pa to form an intermediate layer made of $TiB_2$. The $TiB_2$ layer was then coated with a TiAlN layer having a thickness shown in Table 9 and a center-line mean roughness of at most 0.1 μm at its surface by the ion-plating method. Thus, tools were produced as the examples of the present invention. The comparative examples were produced such that their coated surface had a center-line mean roughness exceeding 0.1 μm.

These tools were used for the continuous cutting of a round bar made of SUJ2 bearing steel having a hardness of $H^{RC}$ 60 and a diameter of 20 mm. The cutting conditions were as follows:

Cutting speed: V=100 m/min.
Depth of cut: d=0.05 mm
Feed rate: f=0.03 mm/rev.
Condition: dry The surface roughness of the machined workpieces was measured after 3-minute cutting. The results are shown in Table 9.

TABLE 9

|  |  | Thickness of TiAlN layer (μm) | Surface roughness of coating (μm) | Surface roughness of machined workpiece Rmax (μm) |
| --- | --- | --- | --- | --- |
| Example | 8-1 | 0.3 | 0.03 | 0.5 |
|  | 8-2 | 0.5 | 0.06 | 0.6 |
|  | 8-3 | 1.0 | 0.05 | 0.5 |
|  | 8-4 | 3.0 | 0.08 | 0.6 |
|  | 8-5 | 5.0 | 0.09 | 0.7 |
| Comparative | 8-6 | 0.5 | 0.23 | 1.0 |
| example | 8-7 | 15 | 0.85 | 1.6 |

As can be seen from Table 9, the examples of the present invention, which had a center-line mean roughness of at most 0.1 μm at the surface of their hard coating, showed small surface roughness in the machined workpieces, demonstrating high-precision cutting. On the other hand, the comparative examples, which had a large center-line mean roughness at the surface of their hard coating, showed large surface roughness in the machined workpieces. In particular, Comparative example 8-7, which had an excessively thick hard coating, developed spalling away of the hard coating, showing large surface roughness in the machined workpieces.

As a matter of course, the coated cBN sintered body of the present invention shall not be limited to the above-described embodiments, and it can be modified within the scope that does not deviate from the essential points of the present invention.

Industrial Applicability

As explained above, the coated cBN sintered body of the present invention enables the realization of high resistance to wear and heat by coating a base material consisting essentially of cBN with a hard coating comprising at least one compound layer consisting mainly of (a) at least one metal element selected from the group consisting of Al and the IV a-group elements and (b) at least one element selected from the group consisting of C, N, and O. In particular, these effects can be manifested notably in the high-speed cutting of steel.

The present invention also provides between the base material and the hard coating an intermediate layer comprising a compound consisting mainly of boron and at least one metal element selected from the IV a-group elements. The presence of the intermediate layer can prolong the tool life because it intensifies the bonding strength between the base material and the hard coating.

What is claimed is:

1. A coated cubic boron nitride sintered body comprising:
   (a) a base material made of a sintered body comprising at least 99.5 vol. % cubic boron nitride (cBN); and
   (b) a hard coating that:
      (b1) is formed on at least part of the surface of the base material by the physical vapor deposition method; and
      (b2) has a thickness of 0.1 to 10 μm,
      wherein the hard coating comprises at least one compound layer, said compound layer consisting essentially of:
   (a) at least one metal element selected from the group consisting of Al and the IV a-group elements; and
   (b) at least one element selected from the group consisting of C, N, and O.

2. A coated cBN sintered body as defined in claim 1, the sintered body further comprising an intermediate layer that:
   (a) is provided between the hard coating and the base material; and
   (b) comprises a compound consisting essentially of boron and at least one metal element selected from the IV a-group elements.

3. A coated cBN sintered body as defined in claim 2, wherein the intermediate layer comprises a boride of a IV a-group element.

4. A coated cBN sintered body as defined in claim 2, wherein the intermediate layer comprises $TiB_2$.

5. A coated cBN sintered body as defined in claim 2, wherein the intermediate layer has a thickness of 0.05 to 3 μm.

6. A coated cBN sintered body as defined in claim 1, wherein the cBN constituting the base material comprises crystal grains having an average crystal-grain diameter of at most 1 μm.

7. A coated cBN sintered body as defined in claim 1, wherein the ratio $I_{(220)}/I_{(111)}$ is at least 0.05 in the X-ray diffraction lines in an arbitrary direction of the base material, where $I_{(220)}$ denotes the (220) diffraction intensity, and $I_{(111)}$ denotes the (111) diffraction intensity.

8. A coated cBN sintered body as defined in claim 1, wherein the base material comprises at least 99.9 vol. % cBN.

9. A coated cBN sintered body as defined in claim 1, wherein the base material has a thermal conductivity of 250 to 1,000 W/m·K.

10. A coated cBN sintered body as defined in claim 1, wherein the base material has a coefficient of thermal expansion of 3.0 to $4.0 \times 10^{-6}$/K in a temperature range of 20 to 600° C.

11. A coated cBN sintered body as defined in claim 1, wherein the base material has a transverse rupture strength of at least 800 MPa when measured by a three-point bending method in a temperature range of 20 to 1,000° C.

12. A coated cBN sintered body as defined in claim 1, wherein the base material has a Vickers hardness of at least 40,000 MPa at room temperature.

13. A coated cBN sintered body as defined in claim 1, wherein the hard coating has a center-line mean roughness of at most 0.1 μm at its surface.

14. A coated cubic boron nitride sintered body comprising:
   (a) a base material made of a sintered body comprising at least 99.5 vol. % cubic boron nitride (cBN); and (b) a hard coating that:
  (b1) is formed on at least part of the surface of the base material by the physical vapor deposition method; and
  (b2) has a thickness of 0.1 to 10 µm, and
wherein the cBN constituting the base material comprises crystal grains having an average crystal-grain diameter of at most 1 µm.

15. A coated cubic boron nitride sintered body comprising:
  (a) a base material made of a sintered body comprising at least 99.5 vol. % cubic boron nitride (cBN); and
  (b) a hard coating that:
    (b1) is formed on at least part of the surface of the base material by the physical vapor deposition method; and
    (b2) has a thickness of 0.1 to 10 µm, and
wherein the ratio $I_{(220)}/I_{(111)}$ is at least 0.05 in the X-ray diffraction lines in an arbitrary direction of the base material, where $I_{(220)}$ denotes the (220) diffraction intensity, and $I_{(111)}$ denotes the (111) diffraction intensity.

16. A coated cubic boron nitride sintered body comprising:
  (a) a base material made of a sintered body comprising at least 99.5 vol. % cubic boron nitride (cBN); and
  (b) a hard coating that:
    (b1) is formed on at least part of the surface of the base material by the physical vapor deposition method; and
    (b2) has a thickness of 0.1 to 10 µm, and
wherein the base material has a coefficient of thermal expansion of 3.0 to $4.0 \times 10^{-6}$/K in a temperature range of 20 to 600° C.

17. A coated cubic boron nitride sintered body comprising:
  (a) a base material made of a sintered body comprising at least 99.5 vol. % cubic boron nitride (cBN); and
  (b) a hard coating that:
    (b1) is formed on at least part of the surface of the base material by the physical vapor deposition method; and
    (b2) has a thickness of 0.1 to 10 µm, and
wherein the base material has a transverse rupture strength of at least 800 MPa when measured by a three-point bending method in a temperature range of 20 to 1,000° C.

18. A coated cubic boron nitride sintered body comprising:
  (a) a base material made of a sintered body comprising at least 99.5 vol. % cubic boron nitride (cBN); and
  (b) a hard coating that:
    (b1) is formed on at least part of the surface of the base material by the physical vapor deposition method; and
    (b2) has a thickness of 0.1 to 10 µm, and
wherein the base material has a Vickers hardness of at least 40,000 MPa at room temperature.

* * * * *